March 19, 1935. W. A. RICE ET AL 1,994,536
METHOD AND APPARATUS OF WEAVING KNOTTED FABRICS
Filed April 29, 1931 5 Sheets-Sheet 1
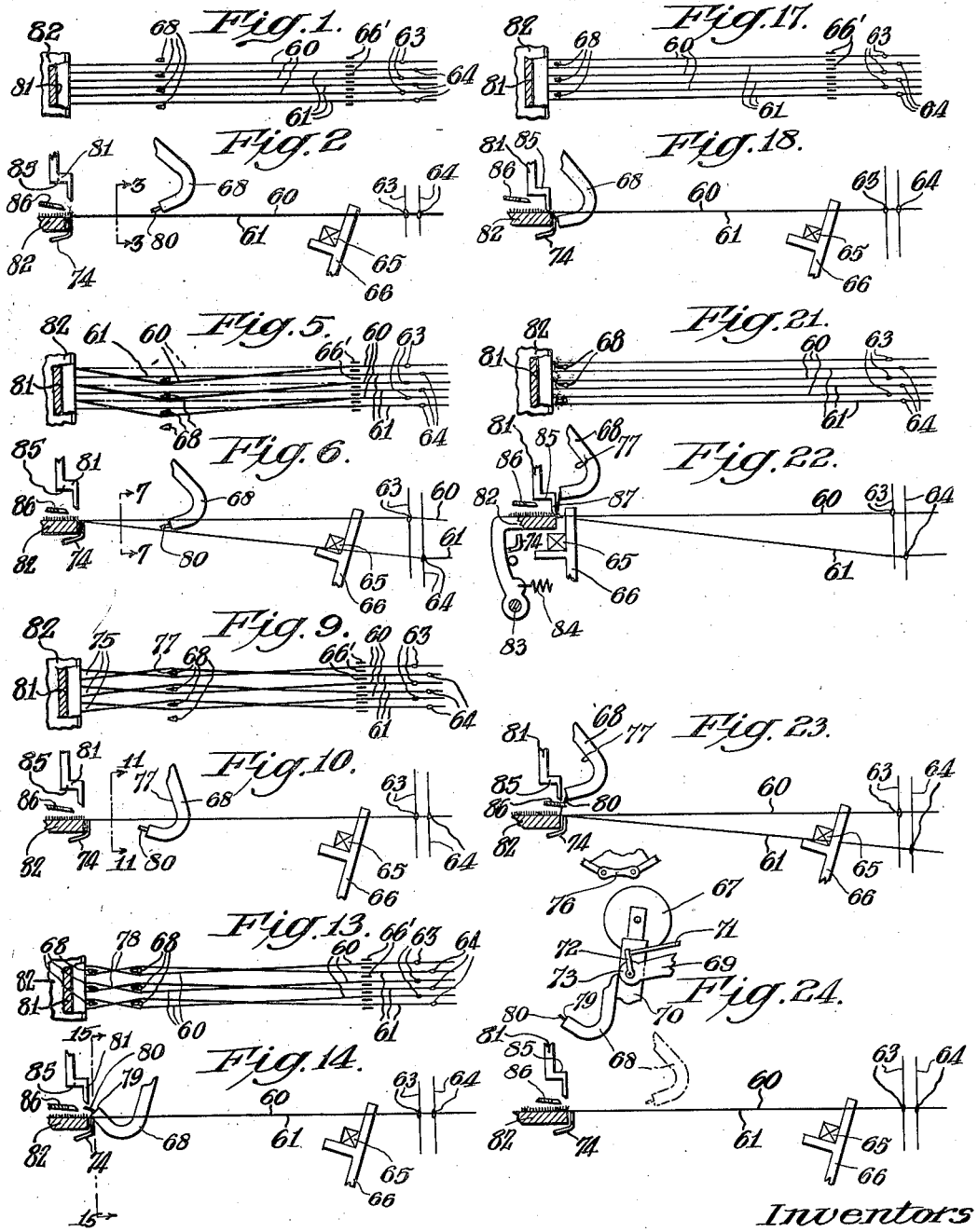

March 19, 1935. W. A. RICE ET AL 1,994,536
METHOD AND APPARATUS OF WEAVING KNOTTED FABRICS
Filed April 29, 1931 5 Sheets-Sheet 2
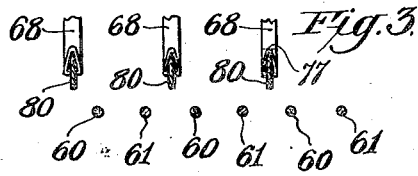
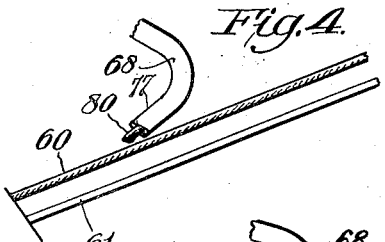
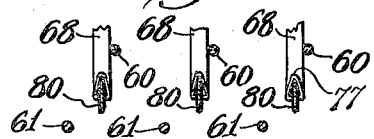
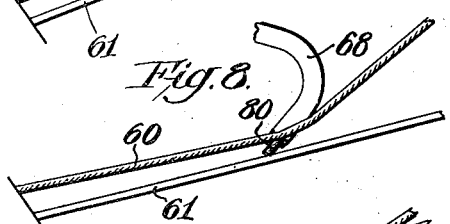
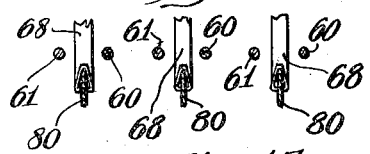
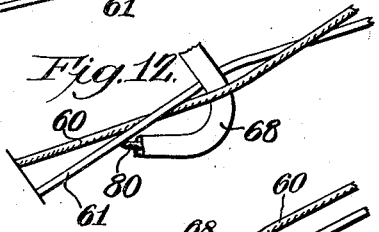
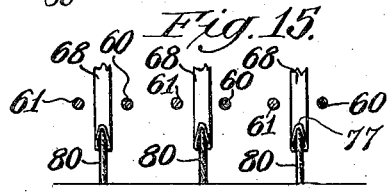
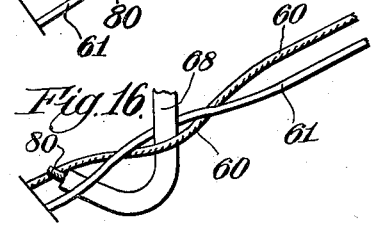
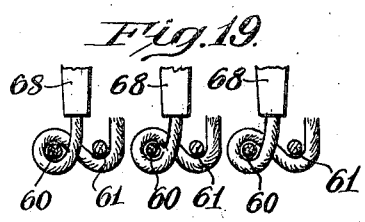
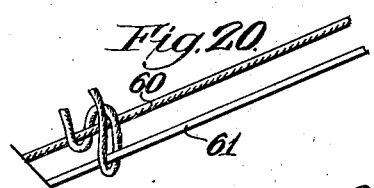
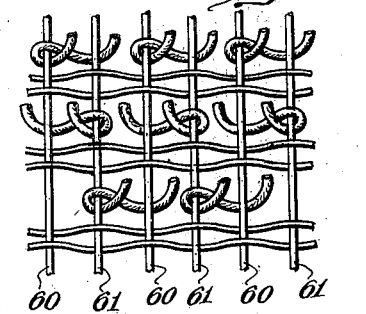
Inventors
Walter A. Rice and
Frank G. Shinn,
By Attorneys.

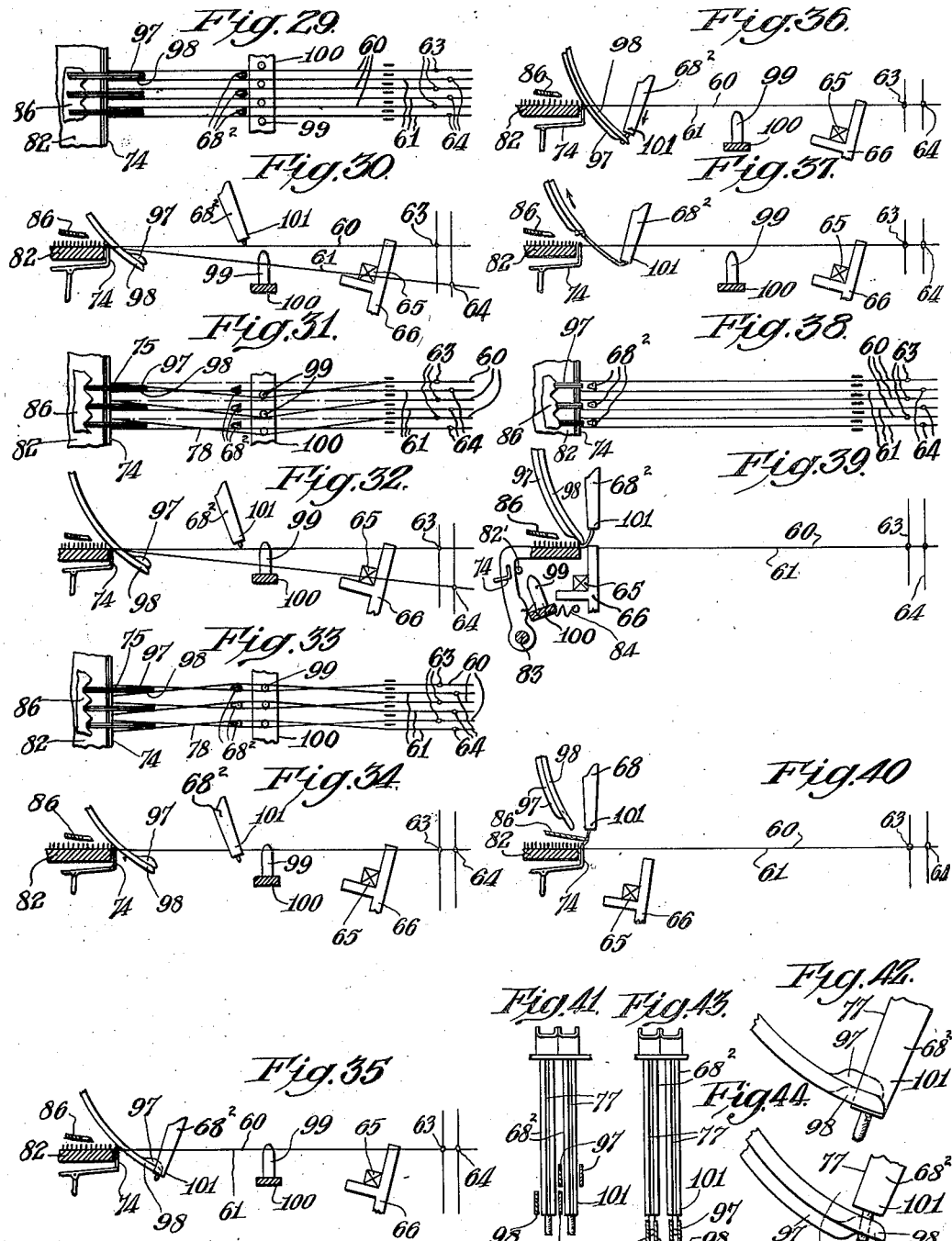

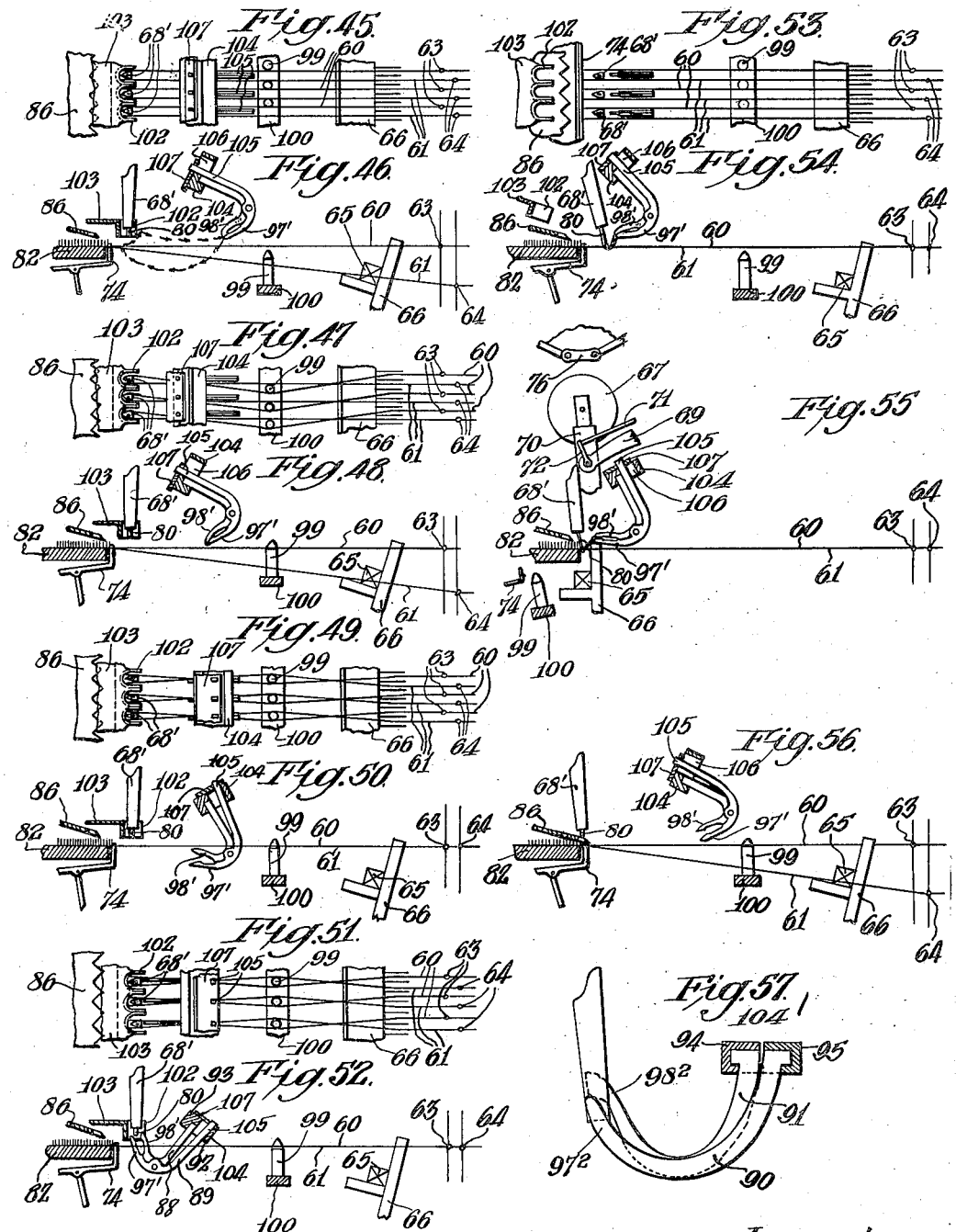

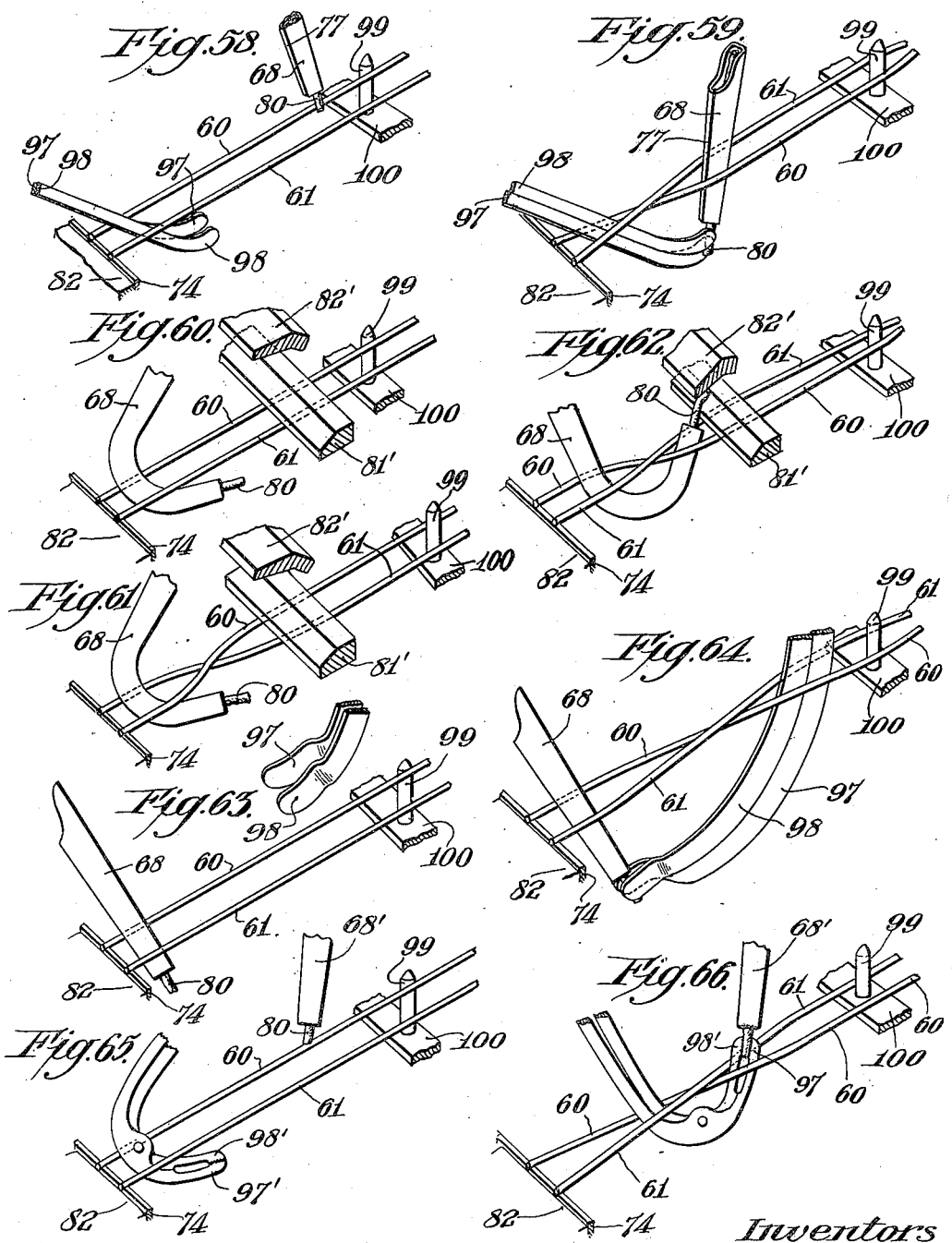

Patented Mar. 19, 1935

1,994,536

UNITED STATES PATENT OFFICE 1,994,536

METHOD AND APPARATUS OF WEAVING KNOTTED FABRICS

Walter A. Rice and Frank G. Shinn, Yonkers, N. Y.

Application April 29, 1931, Serial No. 533,846

50 Claims. (Cl. 139—5)

Our invention relates to a method and to apparatus for weaving knotted fabrics.

A purpose is to adapt methods of oriental knot placement to use in modern weaving equipment such for example as the Axminster type of loom.

A further purpose of our invention is to form a knot as close to the fell as possible.

A further purpose is to utilize a yarn conveyor or carrier and guide to cross the warp threads of a loom and subsequently feed the yarn forwardly through the warp threads so crossed.

A further purpose is to apply knots by means of tubes of the general character used in Axminster weaving, about the warp threads of a loom wherein the filling is injected preferably by a shuttle but permissibly by a needle.

A further purpose is to form the knots between the reeds and the fell and to maintain the reeds continuously in the warp.

A further purpose is to avoid failures in synchronism in knot-holding mechanism such as are likely to occur where the knot is transferred any considerable distance.

A further purpose is to hold the free end of the tuft, preferably both ends, substantially at the fell while the knot is being formed in close proximity to the retained end and beaten up, producing a knot so close to the fell as to retain its tuft lengths during the beating operation.

A further purpose is to use a yarn tube, or other yarn carrier, which has been passed downwardly through the crossed warp threads to advance the point of crossing of the warp threads close to the fell before the yarn is drawn off, facilitating the weaving of a low pile.

A further purpose is in a tuft yarn loom to cross the warp threads, to transfer the tuft yarn across the crossing by a tuft yarn carrier or carriers and to transfer the crossing toward the fell by the carrier or one of the carriers or by the tuft yarn controlled by it, the carrier so used being removed from position between the warp threads while still holding one end of the tuft yarn.

A further purpose is not only to cross the warp threads of a loom by yarn carriers for tuft yarn insertion and to hold them crossed by the yarn carrier until the tuft yarn has been placed across from one side of the crossing to the other, but to realign the warp threads wholly by the tension of the warp threads effective when the carrier is withdrawn.

A further purpose is to start from above and complete above the warp threads the operation of passing tuft yarn through beneath a crossing of warp threads and transferring the point of crossing of the warp threads by tuft yarn inserted or by the tuft yarn carrier by which the insertion is made so that so far as the carrier is concerned release of the crossing may take place immediately when the carrier is lifted above the warp threads and the carrier in this position can hold a tuft yarn end during the operations of warp thread shedding, weft insertion and beating up of the weft and tuft yarn.

A further purpose is to realign warp threads after a crossing and while both ends of each tuft yarn are held above the warp threads so as to complete a knot whose ends are held during weft insertion and beating up to complete the finished knot.

A further purpose is broadly to turn a tube or gripper or other guide substantially about a point at the fell and lift it to draw off the yarn to form the tuft, thereby advancing the crossing point.

A further purpose is to hold the free end of the tuft at the fell and to draw off the yarn for the knot, or, alternatively, to draw the yarn from a tube at the fell and to bring the end of the yarn drawn off up substantially to the fell and at the same time to advance the crossing point of the warp threads by the carrier toward the fell to shorten the yarn drawn off.

A further purpose is to use a curved tube or gripper in order to pass yarn from the rear of the crossing point of two warp threads to the front of the crossing point of the warp threads or vice versa, forcing the knot to the fell and crossing the warp threads before the tube is passed under in the one case, or before or after the tube has been passed under in the other case.

A further purpose is to positively hold the free ends of the knot-forming yarn at the fell and to retain the other ends in guides also at the fell during most of the knot-forming operations and beating up.

A further purpose is to shift the free end of a tuft of pile yarn from a position above the warp at a distance from the fell down through between crossed warp threads at the rear of the crossing point forwardly toward the fell and upwardly in front of the crossing point and there hold it while drawing out the yarn to form the knot, subsequently using the guide by which the yarn has been inserted to advance the position of the crossing close to the fell and while it is so advanced to bring the yarn up substantially to the fell for the introduction of weft thread or binder prior to cutting.

A further purpose is to alternatively use tubes or grippers for yarn transference around the crossing point of warp threads which have been crossed, using the tube alone with grippers substantially fixed in position, (a clamp preferred) or grippers for the entire movement from tubes which do not pass through the warp threads or dipping both tubes and the grippers to perform the gripping operation beneath the warp threads and retracting both, either drawing off yarn by their combined movements or drawing off the yarn preliminarily by the movement of one.

In the weaving of tufted fabrics a further purpose is to save loom time of transferring knots from the position at which they are made to the fell by forming the knots substantially at the fell so that no transfer other than beating is required, holding the knots during the beating.

A further purpose is to produce improved pile fabric surfaces by alternate use of so-called right and left knots. This serves the further purpose of additionally uniting the warp threads. This not only makes a more concentrated or firmer pile but either produces a stronger fabric or permits the use of less filling for the same strength.

A further purpose is to shift the pairing of the warp threads for knot purposes irregularly or alternately in order to tie the individual warp threads of one pair to warp threads of different warp thread pairs to increase the transverse strength.

A further purpose is to vary the construction used to produce the knot substantially at the fell, according to whether my invention is being applied to existing machinery, or to a new machine which is being built.

A further purpose is alternatively to produce the crossing in the warps by the tubes or other yarn guides or by other mechanism as desired.

Further purposes will appear in the specification and in the claims.

It is our intention to include herein broad claims covering the various species shown, not only with tube transfer but with gripper transfer, and whether the carrier transfer be entirely by one gripper or by a plurality of carriers which pass the tuft yarn end fom one to the other beneath the warp threads. It is our expectation to claim the specific inventions directed to gripper transfer in new applications intended to be copending herewith.

Our invention relates primarily to the methods or processes involved but also to mechanism shown.

In the drawings we have preferred to illustrate a few forms only, selecting the forms not only because they are simple, effective and inexpensive, but because they well illustrate the principles involved.

Figure 1 is a plan view of one embodiment of our invention representing the beginning of a cycle.

Figure 2 is a side elevation thereof.

Figure 3 is an enlarged section taken on the line 3—3 of Figure 2, certain of the elements being omitted.

Figure 4 is a perspective view of one set of the elements shown in Figure 3 and occupying the same relative positions.

Figure 5 is a plan view showing the several parts in position occupied in the second step of the cycle.

Figure 6 is a side elevation of the parts as shown in Figure 5.

Figure 7 is an enlarged section taken on the line 7—7 of Figure 6, certain of the elements being omitted.

Figure 8 is a perspective view of one set of the elements shown in Figure 7 and occupying the same relative positions.

Figure 9 is a plan view showing the several parts in the position occupied in the third step of the cycle.

Figure 10 is a side elevation of the parts as shown in Figure 9.

Figure 11 is an enlarged section taken on the line 11—11 of Figure 10, certain of the elements being omitted.

Figure 12 is a perspective view of one set of the elements shown in Figure 11 and occupying the same relative positions.

Figure 13 is a plan view showing the parts in the relation occupied in the fourth position of the cycle.

Figure 14 is a side elevation of the parts as shown in Figure 13.

Figure 15 is an enlarged section taken on the line 15—15 of Figure 14, certain of the elements being omitted.

Figure 16 is a perspective view of one set of the elements of Figure 15, occupying the same relative positions as there occupied.

Figure 17 is a plan view as shown and occupied in the fifth position of the cycle.

Figure 18 is a side elevation of the parts in Figure 17.

Figure 19 is an enlarged fragmentary section taken on the line 19—19 of Figure 18, certain of the elements being omitted.

Figure 20 is a perspective view of one set of the elements shown in Figure 19 and occupying the same relative positions.

Figure 21 is a plan view of the sixth cycle.

Figure 22 is a side elevation thereof.

Figure 23 is a side elevation showing the parts as occupied in the seventh position of the cycle.

Figure 24 is a side elevation of the parts occupied in the ninth position of the cycle.

Figure 25 is a view similar to Figure 19 showing a completed so-called right-hand Persian knot.

Figure 26 is a view similar to Figure 25 showing the so-called left-hand Persian knot.

Figure 27 is a view similar to Figure 25 showing a right-hand knot formed about pairs of warp threads alternately paired to those of Figure 25.

Figure 28 is a view in perspective of loosely formed Persian knots showing the three forms illustrated in Figures 25, 26 and 27 and having two shots of binder weft threads interposed between each adjoining rows of the knot formations.

Figure 29 is a plan view of a second form of our invention and represents the first step of the cycle to form a tufted knot.

Figure 30 is a side elevation of the several parts shown in Figure 29.

Figure 31 is a plan view of the parts in the second step of the second form.

Figure 32 is a side elevation of the several parts shown in Figure 31.

Figure 33 is a plan view of the third step of the cycle of the second form of our invention.

Figure 34 is a side elevation of the several parts shown in Figure 33.

Figure 35 is a side elevation illustrating the fourth step of the cycle to form a tufted knot according to the second form.

Figure 36 is a side elevation illustrating the fifth step of the cycle to form a tufted knot.

Figure 37 is a side elevation illustrating the sixth step of the cycle to form a tufted knot.

Figure 38 is a plan view illustrating the seventh step of the cycle to form a tufted knot.

Figure 39 is a side elevation of the parts shown in Figure 38.

Figure 40 is a side elevation illustrating a further step in the cycle of the second form.

Figures 41 and 43 are enlarged front elevations of two tubes feeding tuft yarns showing the relation of the gripping members in different gripper positions.

Figure 42 is a side elevation of a portion of the tube members as shown in Figure 41.

Figure 44 is a side elevation of a portion of the members shown in Figure 42.

Figure 45 is a plan view of a further modification (the third form) illustrating the several parts occupying their relative position in the first step of the cycle.

Figure 46 is a side elevation of the parts as illustrated in Figure 45.

Figure 47 is a plan view of the third form (of Figures 45 and 46) illustrating the several parts occupying their relative position in the second step of the cycle.

Figure 48 is a side elevation of the parts as seen in Figure 47.

Figure 49 is a plan view illustrating the several parts occupying their relative position in the third step of the cycle.

Figure 50 is a side elevation of the parts as seen in Figure 49.

Figure 51 is a plan view of the same form illustrating the several parts occupying their relative positions in the fourth step of the cycle.

Figure 52 is a side elevation of the parts as seen in Figure 51.

Figure 53 is a plan view of the same form illustrating the several parts occupying their relative positions in the fifth step of the cycle.

Figure 54 is a side elevation of the parts as seen in Figure 53.

Figure 55 is a side elevation of the same form illustrating the several parts occupying their relative position, in the sixth step of the cycle.

Figure 56 is a side elevation of the same form illustrating the several parts occupying their relative position in the seventh step of the cycle.

Figure 57 is an enlarged side elevation illustrating an alternative gripping mechanism.

Figures 58–66 are perspectives used in showing that yarn carriers can be inserted between warp threads before they are crossed and that reversals of certain constructions are suitable for operation. Figures 58 and 59, 63 and 64 apply to our second form, 60 and 62 to our first form and 65 and 66 to our third form.

In the drawings similar numerals indicate like parts.

Our invention is directed to the machine production of knotted fabrics whether in rugs, carpets or tapestry, using the Persian knot. The product is intended to correspond with the well known hand-formed Persian rug and tapestry products, and our process, and mechanism are, therefore, confined to the movements of elements—which may be moved by hand—to facilitate tying of these knots, but which, for commercial operation, must be operated by machinery.

The fragmentary mechanisms shown are capable of being hand-operated, but the advantage to be secured lies in the fact that these fragmentary showings are suitable for assembly as parts of a large loom for operation which loom can be made up of a large number of like units in coincident operation.

In the various illustrations shown we have passed the free end of a tuft yarn through in the rear of the crossing point of crossed warp threads to the front of the same so as to emerge close to the fell or have passed the tuft yarn in the opposite direction, drawing off the yarn to supply a knot, bringing the attached end of the yarn around also or retaining it close to the fell. The yarn may be drawn off at any part of this operation, but the two ends of the yarn are brought substantially together at the fell and are held there taut while the next weft thread or weft threads is or are inserted and are beaten up, securing uniformity of the ends and avoiding slack yarn at the back which would result in what is called "a dirty" back. The attached end is finally severed.

In Figures 1–4 warp threads are shown in levelled position for the beginning of a cycle of operation performed by use of a yarn carrier. This may be of any type which will perform the function.

For convenience and in dealing with all of the forms, we will treat yarn "carriers" as of two classes only, namely, "tubes" where the yarn passes through them except as it may be restrained at the spool and may be withdrawn through their length, or by their movement, and "grippers", where the yarn is firmly held by the carrier and the gripper is moved to transfer the yarn by the movement of the carrier.

Both terms "tubes" and "grippers" are used in their broad sense here and are not restricted to the species generally known in the art in which the tube is a straight tube, for example, and in which the ordinary gripper comprises laterally separable members which close about the yarn to grip it laterally. The term "tube" is not intended to require that the carrier shall enclose the yarn throughout its length, and would be satisfied by any carrier which forms a guide at the necessary point or points about the yarn, carrying the yarn with it in its movement and allowing the yarn to be fed into it and to be withdrawn through it.

Where the tube is intended to perform the additional function of laterally engaging alternate warp threads to cross the warp threads there is, preferably, an initial shed formation to facilitate this purpose.

In Figures 3 and 4 the parts of Figures 1 and 2 are shown in enlarged section and in perspective, the showing of Figure 4 illustrating one pair only. The alternate warp threads are stippled in Figure 3 to indicate the warp threads which travel together to form a shed and which pair with different intermediate warp threads to form the cross.

In carrying out our invention we employ warp threads 60 and 61 which pass from a fell 62 back through the loom to heddles 63 and 64 and then over the usual tension devices to a source of warp thread supply not shown.

The usual shuttle 65 is carried by a lay 66 and is adapted to be shot back and forth across the lay through a shed in a manner common and well known in this art in order to place one or more weft threads or binders. The yarn intended for the formation of the yarn tufts is carried upon spools 67 which are rotatable within frames carried by a chain as is common in Axminster weaving and the yarn fed through tubes 68, the spools and tubes being detachable from the chain for use in turning being controlled by an arm 69 and frame 70. The tubes are given independent movement by means of a rod 71 through crank arm 72 pivoted at 73.

This mechanism as so far described is generically old in the Axminster loom art, but the tubes used by us in the first form of our invention are different from the Axminster tubes. The general control of the movement is intended to be the same as in the Axminster art, by suitable cams, etc., but the specific movements given and the timing of these movements will, of course, be suited to our processes and methods.

The yarn supplied from the spool is threaded through the carriers—here the tubes, and projects from the bottoms of the tubes to present a free end to each pair of warp threads 60 and 61 within the loom.

In the group of Figures 5–8, a shed has been formed to permit alternate warp threads to be caught laterally by the tubes 68 and moved laterally. Here the warp threads 60 have been engaged by the tubes, and the tubes have been shifted laterally to a necessarily disproportionate distance (if all of the movement is to be given by the tubes) as compared with their final crossover position in order that they may then be sufficiently beyond the warp threads 61 for the tubes to engage the warp threads 61. The tubes and warp threads 61 are relatively shifted vertically to permit these engagements.

The tubes are then shifted back laterally to an intermediate or neutral position in which the warp threads 61 have been carried with the tubes to the same extent of diversion as the warp threads 60 have at that time. Since this shed formation is not intended to provide a shed for a "shot" of weft it need not form the normal shed either in distance of warp thread movement or in the equality of movement of the upper and lower warp threads. For example, though the normal shed shifting will be most convenient and very desirable, the entire shed can be formed by the upward shifting of one group of warp threads, or by the downward shifting of the other.

If the shed be made originally by lifting alone the tubes have to be dipped along with the upper warp threads. The second movement of the tubes brings or, generally, the leveling of the shed brings the parts into the position shown in top plan view in Figure 9, but in this figure it must be kept in mind that the tubes have not only been lowered but have been revolved a short distance, as about the tube frame axis, so that the tube in Figure 10 is advanced in a right-hand or clockwise direction with respect to the tube position in Figure 6.

The positions of the parts as so far described are shown in Figures 5 and 6 for the initial transfer movement of the tubes and the position of the crossed warp threads are shown in Figures 5, 6, 7 and 8, and the positions of the parts after the tubes have engaged with the intermediate warp threads and have shifted to neutral position are shown in Figures 9, 10, 11 and 12.

In all of these figures we have shown a comb 74 at the fell to maintain the warp threads in separated position so that spaces 75 between the warp threads will be open in front of the crossing points.

It will be understood that the tube supports and spools used can be carried upon a chain such as the chain 76 of construction familiar in Axminster weaving.

It is recognized, of course, that reversal in the direction of lateral movement of the warp threads of the individual pairs whether effected by movement of the tubes or otherwise will cause a reversal of the knot, forming a left-hand knot, for example, as compared with a right-hand knot. However, it is also recognized that either knot will be effective for the purpose, and that there is advantage for some purposes in not forming the same "hand" of knot consistently. Preferably the same direction of shift and the same heddle control is used throughout a row though even this is not necessary. Reversal row by row will be advantageous in giving greater concentration of knots and the result is effective whether the shifting be accomplished upwardly or downwardly, or by joint action and whether the lateral movement of the warp threads be effected by tubes or by the heddles, or by guides, or other mechanisms.

To reverse the knots with the same "pairing" of the warp threads not only the direction of shifting of the tubes but the direction of shifting of the warp threads of the pairs to form the shed should be reversed. Ordinarily the shed will be formed, the tubes will be dipped through its upper layer of warp threads and the tubes will be shifted. The warp threads will then be leveled to bring the lower warp threads up about the tubes and the tubes will be shifted back to neutral position.

By the use of four heddles or two heddles with top and bottom alternating in their pairing laterally, shifting, adjoining knots in the same row can be formed, one right, the other left. Though the adjoining rows would best be alternated for most purposes, one right, the other left, some advantage is secured even when more than one row is woven right-handed and more than one row left-handed and so on.

At some such point in the movement of each tube 68 after it has passed downwardly through the crossed warp threads, whether the crossing of the warp threads was effected by the tube or by other means, the tube is advanced toward the fell and the front 77 of the tube engages the warp threads to carry their separation points seen in Figures 9 and 13 toward the fell so that the actual crossing points 78 of the warp threads may be made to closely approach the fell. This movement is preferably a swinging movement by which conveniently the end 79 of the carrier emerges upwardly through the spaces 75 bringing the free ends 80 of the tuft yarn into position to be concurrently detained in position there by separate holding devices or by a holding device such as 81 common to all of them.

Even the common form of clamp 81 can, of course, operate in different ways and we have for convenience shown a form in which the lower clamp member 82 lies beneath the warp threads, but this is not necessary. With the form shown the member 82 beneath the warp thread is desirably pivoted at 83 and spring drawn rearwardly by spring 84 so as to be capable of being moved out of the way when the knots and weft are beaten up by the lay. The upper clamp 81 is conveniently offset at 85 so as to provide room for the knife 86 and also to place its operating edge 87 out of the way of the tube frame, not shown, but which may conveniently be of the ordinary type used in Axminster rug weaving.

In the final movement of the tubes, the crossing points are forced closer to the fell, preferably by the rocking of the tube in a general curved direction indicated by arrow 88 so that in the position shown in Figure 18 the crossing points have been brought very close to the fell. The tube may be swung about a center near to the noses of the tubes. The exact movement of the tubes at this point affects chiefly the length of yarn required to produce the knot. For a very low pile it is desirable that the crossing points be shifted substantially to the fell, but if a considerable height of pile is to be woven it is of much less importance that the crossing points be very close to the fell. The chief objection to having the crossing point far from the fell then lies in the fact that the knots may have to be transferred during the beating up from a distance corresponding to this additional distance by which the crossing points are spaced from the fell.

Alternatively the noses of the tubes can be lowered with respect to the position shown in Figure 14 and then counterclockwise revolutions of the tubes can be used to turn the tubes substantially about the noses of the tubes and finally they can be lifted up through the crossed warp threads to give a very short pile height.

Our processes and methods facilitate the formation of an extremely low pile, but can be used also to great advantage even where the pile is to be a long one, since they have the decided advantage of forming the knots very close to the fell so that there is only the shortest distance for the knots to be moved and so that there consequently is almost no opportunity to distort the knots by this movement through variations of the length of the two end portions of the knot. However, we avoid risk even of this distortion in my preferred form by holding both ends of the tuft until the next weft thread shot, or shots, have been beaten up. With the shortness of movement holding both ends of the tufts maintains the initial tight contacts of the pile yarn of the knots with the warp threads and also secures uniform height for both tuft ends. Great variation in the character of tuft yarn carrier, in the direction of its movement and in its cooperation with other mechanism may take place without losing these advantages.

Though necessarily we have given a great deal of attention to the formation of the knots it will be recognized that the need of the knots goes back to the main problems of maintaining the tuft positions during the making and the life of the rug and avoiding looseness of tuft yarn in the back of the fabric, both of which problems require some kind of a knot in order to avoid slippage of the tufts from the positions in which they are set.

It will be evident also that the retention of the hold upon both ends of the tuft yarn until after the beating up is important in order that tufts may not be altered in their position and the yarn may not be loosened about the warp threads during or subsequent to the beating operation.

The final movement of the tube from the position of Figure 18 is preferably upward to some such position as that shown in Figure 22, but obviously the movements of rotation and the vertical movements of the tubes can be combined to form composite paths of movement of the tubes, preferably to position shown in Figure 22 in which, or in some position, the tubes are held while a second shed is being formed and one or more shots of weft yarn are put in and beaten up.

The movement of the tube can swing wholly about the open end of the tube or down and around, or downwardly and upwardly with only enough swinging movement to keep the crossing point reasonably close to the fell, with final upward and inward movement to tighten the knot and draw it toward the fell. The needs and desirabilities will, as indicated, depend in part upon the length of the intended pile and may be made to turn in part upon the ease of giving the tube 63 the intended movements.

After the beating up, the clamp or clamps is or are released and ordinarily one or permissibly both of the tuft ends is or are cut. The position of the attached end at the time of cutting can be so accurately determined that in usual operations the length of the clamped end is very accurately predetermined and it will ordinarily not be necessary to cut the free end of the yarn which has been held under the clamp during these operations. However, these tufted fabrics offer the same opportunity for additional cutting to exactness of height of tuft if desired, as in any other pile fabric and both tuft ends are here held close together where they can both be cut if desired and if allowance has been made for cutting in the extension of the free end.

It will be evident that the additional yarn for the knots and for the tufts can be drawn off from the position shown in Figure 22, for example, before the yarn is cut if desired, or this additional yarn can be pulled out from the tubes at any stage of the operation which has been described. Except as we claim preferred forms we do not, therefore, wish to be restricted in this particular.

It will be evident that though the form so far described is the best form of the particular type in which the tube is used to shift the warp threads, many approaches to it will be desirable even though they do not offer the same advantage as that offered by the form which we have described.

The tube form shown in Figures 1-24, as also the other forms shown by us, is reversible to obtain part of the benefit of our invention by entering the tube at a point close to the fell. As seen in Figures 60, 61 and 62 this permits the tube to be inserted between the warp threads before the warp threads are crossed, if this be desired, though, of course, the tube can be inserted between the crossed warp threads.

In Figure 60 the wrap threads are not crossed and the tube has already been inserted between the warp threads. The grippers 81', 82' lie above the warp threads to receive and clamp the free end of the tuft yarn after the warp threads have been crossed, as in Figure 61 and the end of the tube carrying the free end of the yarn has emerged upwardly through the crossed warp threads in the rear of the crossing point, as seen in Figure 62.

These Figures 60, 61 and 62 therefore illustrate not only that the tuft yarn carrier may be inserted in this instance before the warp threads have been crossed, but, by ways which are shown in the form of Figures 1 to 24, the yarn can be passed from the front of the crossing point to the rear of the crossing point. After the free end of the yarn has been clamped between the members 81', 82' the tube is removed from its position between the warps of the pair and the warp threads are allowed to straighten out forming the knot. The gripping members 81' and 82' are then moved up close to the fell and the end of the tube carrying the attached yarn is held close to the fell to maintain and hold the knot as close to the fell as possible while a weft shot is being introduced and is being beaten up.

Where we speak of a weft, a weft thread or weft threads being inserted and being beaten up by the reeds we have in mind not only the fact that any desired number of weft threads can be supplied, but that the weft may be single if applied by a shuttle but will have to be double if applied by a needle as in normal Axminster practice.

What has been said about Figures 1-24 applies very generally also to our second form seen in Figures 29-44, which, however represents a reversal in large measure of the structures in Figures 1-24.

Whereas in Figures 1-24 a curved tube passes down through between the warp threads and up again after the warps have been crossed and the free ends of the yarn are clamped at the fell, the structures in Figures 29-44 use a gripper to transfer the yarn for all or a part of the corresponding distance either down through the warp thread and up again after the warp threads have been crossed or pass the yarn down through the warp threads by a tube and meet it beneath the warp threads by grippers which bring it up again in front of the crossing position. The parts having the same character are given the same numbers in these figures as in the corresponding figures of the first form.

The tubes are indicated at 68' in each and the grippers as comprising two gripper parts 88, 89, suitably controlled. A comb 96 is used to effect crossing as in these variations the crossing is not to be effected by the tube nor by the grippers and a comb is used as generic of any form of separate crossing means which may be used whether it control the position of the terminals of the warp threads or engage the exteriors of the warp threads to move them laterally in these figures.

Figures 29 and 30 correspond in warp thread positions with Figures 1 and 2 respectively.

Likewise Figures 31 and 32 correspond in warp thread position with Figures 5 and 6; Figures 33 and 34 correspond in warp thread positions with Figures 9 and 10; and Figures 35-41 correspond with Figures 13 and 14, 17 and 18, 21-23.

The tubes in Figs. 29-44 are designated as $68^2$.

Taking up now the form in which both the tubes and grippers operate to effect the operation performed by the tubes alone or the tubes in conjunction with the holding mechanism for the free ends of the yarn in the earlier figures:—

The parts are shown in Figure 29 in the position which they may occupy before the warp threads are crossed. The grippers 97 and 98 are there shown as passed between the warp threads before the warp threads are crossed and a shed has been formed for the purpose of permitting the lower warp threads of the shed to be laterally diverted by the teeth 99 of the comb 100. Since no considerable change has been effected in the position of the ends of the warp thread at the fell in Figures 29, 30, 31, 32 and 33, obviously the grippers need not be passed down through the warp threads with the warp threads in the position shown in Figures 29 and 30 and need not be passed down until such time as they are intended to engage with the ends 101 of the tubes as seen in Figure 35. However, for reasons of smoothness and regularity of operation it may be desirable to progress the grippers through the warp threads prior to the time when they will be needed to perform their function there with the tubes and before the crossing of the warp threads.

In Figures 31, 32 and 33 the comb 100 (which may be a reed) performs substantially the same function as the tubes of the earlier figures, of at first (Figure 31) drawing alternate warp threads far enough the intermediate warp threads for the comb to engage the outer sides of the intermediate warp threads and to carry the latter back while slackening the tension upon the warp threads initially engaged, to form a centrally disposed shed in Figure 33 corresponding to the centrally disposed shed formed in Figure 9.

The cooperation of the heddles to form suitable shed takes place in these forms as in the forms of Figures 5, 6, 9 and 10 but the shed is already formed in Figure 29.

When the crossing of the warp threads has been effected as seen in Figure 33 the tubes—again emblematic of any yarn carrying device—can be passed down through the warp threads in the rear of their crossing points and the grippers—if they have not already been passed down through the warp threads—are passed down in front of the crossing points of the warp threads to meet the tubes beneath the plane of the now levelled warp threads so that the grippers can engage the free ends 80 of the yarn.

Because of the desirability of gripping the free yarn ends uniformly, the grippers are initially passed over the ends 101 of the tubes so that they will be reliably open and reliably positioned with respect to the free ends of the yarn and will wipe the yarn into uniform gripping position.

It is desirable to move the crossing points of the warp threads from their positions as shown in Figure 33 to positions corresponding generally with those shown in Figure 13 and any extent of movement of the crossing points toward the fells desired may be effected by movement, preferably swinging movement of the tubes, such as, for example, is indicated as taking place between the positions shown in Figure 34 and in Figure 35. The movements of the tubes can be accomplished by the movements of such tubes as are carried in Axminster tube frames, and the tubes can be changed to use any tube frame presented by a chain of the Axminster type.

The exact time when the tube is used to shift the crossing points of the warp threads closer to the fell will obviously not be material provided it does not require paying out an undue length of the yarn from the tube. For example the grippers may engage the free ends of the yarn to the right in Figure 35 of the position in which they are shown, engaging before the tubes have swung to the position shown in Figure 35, and, therefore, before they have shifted the crossing points of the warp threads; and the grippers may move from this position different from that of Figure 35 of free end engagement with the yarn at the same time that the tubes are moving and at nearly enough the same rate of speed not to pay out an undue length of yarn.

Even if lack of complete register in their movements should leave a slack in the yarn in the position shown in Figure 36, this would not be objectionable provided it be not in excess of the amount of slack which is contemplated at this position of the tube, as seen for example in Figure 37.

Recurring to the positions in Figure 35, the tubes and gripper jaws have relatively wiped into each other as by clock-wise movement of the tube between the ends of the grippers so as to separate these gripper ends about the ends of the tubes. If then the gripper ends be moved lengthwise of the outlet ends of the tubes they will still remain separated until they are released from the ends of the tubes when they will close and will wipe straight or comb and close upon the free ends 80 of the yarn.

These end positions of the grippers, tube and yarn are shown in enlarged views in Figures 41-44 from which it will be seen that the grippers will reliably engage the free ends of the yarn when the grippers snap off from the ends of the tubes. This position is shown in Figure 36.

The grippers are then moved through the crossed warp threads in front of the crossing to some such position as that shown in Figure 37 and are there held while the tubes are shifted upwardly and forwardly to positions above the warp threads, such, for example, as the positions shown in Figure 39, at which the tubes are held, retaining the attached ends of the tuft yarn.

The yarn spools are locked against turning if required in order to keep the yarn taut.

This completes the Persian knot close to the fell ready for it to be secured in position by the next weft thread or weft threads which are beaten up against the knots by the reeds.

This operation of putting in the shots and beating up the weft thread or weft threads, as shown in Figures 22 and 23, has not been repeated in the new figures.

During the operations described the position of the comb may not be material after it has performed its work in crossing the warp threads and in holding them separately in crossed position as in Figure 33, so that the tube can be inserted within the passages through the warp thread provided by the comb. It must, of course, be withdrawn before the warp threads are "uncrossed". The suggested successive positions of the comb have been indicated in the figures with the thought merely of having them remain out of the way but without thought of requiring that they shall occupy the particular positions shown.

After the suitable shed or sheds have been formed and one or more weft threads have been inserted and the weft threads have been beaten up against the knots the attached ends of the tuft yarns can be cut to correspond with the lengths of the free end or if additional height of the tufts this additional length can be provided by cutting the attached ends of the tuft yarn to give a corresponding initial height of tuft.

Both ends of the tuft are held tight in the final positions and can be cut correspondingly. However, one considerable advantage of our invention lies in the ability to accurately predetermine the lengths of the free ends of the yarn projecting from the tubes so as to permit close approximations to the same exact lengths of the yarn ends held in the grippers and constituting the so-called free ends of the tuft yarn, permitting these free ends to be matched by the cutting of the attached ends so as not only not to require recutting of either of the tuft ends but to permit the weaving of a very low pile fabric whose pile length has been determined by the free end length of the yarn projecting from the tubes.

In both of the forms of the invention so far described the pile fabric has been supported beneath the lay by the resiliently held breast plate 82 which is stopped by pin 82'. As described the platen gives proper vertical support for all operations desired and yet yields in a counterclockwise direction so as not to prevent beating up of the wefts by the reeds.

This second form by which our present invention is illustrated—as also the third form—has the same capability of reversal of directions of insertion, movement and removal of the yarn guides and grippers respectively with the yarn guides in the first form, but with less chance of objection because of danger of placing the knot further from the fell since that can be taken care of here in the division of movement between the yarn guides and grippers.

In Figures 58 and 59 the several steps of Figures 29 and 30 on the one hand and 36 on the other are shown in perspective in order to emphasize the fact that the grippers can be inserted before the warp threads are crossed, if this be desired; but as will be seen clearly from Figure 59 a space still remains at the front of the crossing point for insertion of these grippers even after the crossing point has been advanced toward the fell by the movement of the yarn guide. Of course, much more space exists for insertion of the grippers in front of the crossing after the crossing has been effected and before the crossing point has been advanced. The time of insertion of the grippers, before or after the crossing can clearly, therefore, be selected at will in this form also.

Figures 63 and 64 are intended to illustrate the point made above that this second form also of our invention, characterized by the delivery of the free end of the tuft yarn to grippers beneath the pile, is capable of being reversed by reversal of the relative positions of the yarn guide and grippers, namely, by inserting the yarn guide close to the fell and the grippers at the rear of the crossing points.

As will be seen, with this reversal the yarn guide can be inserted either before or after the crossing of the warp threads, depending upon the cycle of movement preferred by the designer.

Since the yarn guide in its downward movement—and also in its withdrawal—can be made to advance the crossing point toward the fell to the same purpose and effect as the tube is used for this advancement of the crossing point in the form shown in Figures 34–39, this reversal is not subject to disadvantage in endangering the formation of the knot, as the knot can be formed quite as close to the fell with the reversal as with the form shown in Figures 29–39.

The form shown in Figures 45–57 differs from the form last described in four main particulars in that the tubes are nearly stationary and are located at the weft threads; in that practically the entire yarn movement is effected by grippers; in that the grippers move away from substantially fixed positions of the tubes determining the attached ends of the yarn instead of toward tht fells; and in that the advancement of the crossing positions of the warp threads is caused by gripper movement rather than by movement of the tubes. Some of these can be reversed as seen in Figures 65 and 66.

The third form Figs. 45–57, resembles the other two forms in a great many particulars, among which may be mentioned the fact that no considerable quantity of yarn need be paid out from the yarn guide or carrier (here a tube) until the parts are in position to withdraw a movable member upwardly through the warp threads to pass the yarn about the warp threads into knot formation; in that a movable member is used to advance the crossing point of the warps close to the fell before withdrawal of the movable member and very desirably during removal; in that the knot is formed close to the fell, leaving no substantial distance for travel of the knot along the warp threads; in that the final movement upwardly through the warp threads may be a swinging movement which brings the terminal of the movable member into final position close to the fell; and in that the combined tube and gripper action, or gripper action in which the second and third forms vary from the first may be viewed largely as reversals in part or in whole of the relations of the parts in the first figures.

It will be evident that the question of whether the Persian knots formed be so-called right-handed or left-handed depends in our second and third forms also upon so slight a difference as whether the shifted warp threads be moved initially toward the bottom of the Figures 5, 31 and 47, or shifting first the other warp threads, toward the tops of these figures. That they can be varied even within the lengths of the same row of knots and tufts by merely operating the heddles differently for the warp threads which are to be crossed for different (i. e. right or left) knots and shifting the tubes or comb teeth in opposite directions for the two characters of knot. The shifting of the tubes or comb teeth oppositely is undesirable within the same row as it would require complicated tube support and combs; but the entire tube support or comb can be shifted in opposite directions for adjoining rows.

In the forms of Figures 45–56 and a modification of Figure 57 the tuft yarn guides (tubes) 68' are registered in position and supported by guides 102 supported from any suitable brackets 103, and the grippers 97', 98' are shown as occupying the position relatively and moving generally along the lines of the tubes of the first form (Figures 1–24) so that the entire yarn movement may be effected on the withdrawal of the grippers. The warp threads are crossed in any suitable way.

The grippers need not be used for this purpose and in this particular may or may not act like the tubes of Figures 1–10. In fact in Figures 45–50 the crossing of the warp threads has been effected by the fingers 99 of a comb 100.

After the warp threads have been crossed the grippers are inserted. They preferably advance the crossing points during their insertion so that in the position in Figure 52 the crossing points have been advanced considerably toward the fell. Whether the grippers advance the crossing points during their insertion or not they are desirably swung upwardly and forwardly to advance the crossing points or to advance the crossing point still further during withdrawal after they have closed upon the end 80 of the tuft yarn. During their withdrawal they draw the tuft yarn through the crossed warp threads. This may evidently occur either by drawing the end 80 of the yarn down under the warp threads in front of the crossing and back up at the rear of the crossing and advancing the end 80 to some such position as that shown in Figure 45, or can be done by pivoting the grippers in their movement subsequently about their closed ends so as to nearly, or entirely, lift the warp threads during the passage through from the front to the rear of the crossing points. Whether the warp thread be lifted at this point or not it will be seen that the free end must pass under the crossing.

The positions of the spool 67 and tube 68' with respect to their frame 70, support arm 69, control rod 71 and arm 72 are generally similar to those shown in Figure 24, but the movement of the tube effected by its support is not as great and somewhat different from that in the other figures. The moving mechanism for the grippers is not there illustrated, but can readily be effected by cams.

The grippers 97', 98' are supported in a bar or frame 104 through support of one of the grippers and the other passes at 105 through an aperture 106 in the first gripper and is controlled by movement of a plate 107. The same frame and plate control are used to operate all of the grippers.

The grippers shown in Figures 45–56 are the scissors type as compared with the grippers shown in Figures 29–44 and the grippers shown in Figure 57.

The grippers shown in Figure 57 are operated by bars 104' which are moved relatively to each other to rock one lateral gripper member $97^2$ with respect to another $98^2$.

Where the gripper is intended to comb the free end 80 of the tuft yarn it may actually engage the guide or merely span it, as preferred, but should be capable of engaging and holding the free end of the yarn after it has wiped the yarn down into reliable position. This is true not only in the form shown in Figures 35 and 36, but of the form shown in Figure 57.

Figures 65 and 66 are shown for the purpose not only of illustrating a reversal of the form of Figures 45–56 but furthermore to point out that the grippers when used at the fell instead of beyond the crossing from the fell may be inserted through the warp threads, either before or after the warp threads are crossed. In this form the grippers may be advanced toward the fell from the position shown in Figure 66, the guide 68' advancing with it so as to shift the crossing point as near to the fell as possible. This form is slightly less advantageous than that of Figures 45–56 in that the knot is formed disadvantageously farther from the fell than in the other forms, making it necessary to beat up the knot along with the next shot of weft to a greater distance of knot travel than in the other forms. This is relieved by the fact that the free end of the tuft yarn and the end of the tuft yarn in the carrier 68' can be drawn toward the fell, (while maintaining their spacing,) after the free end of the yarn has passed through under the crossing and has emerged on the forward side of the crossing.

Though we have referred at various places to similarities to an Axminster loom construction and the handling of tube frames in a manner bearing considerable resemblance to that of Axminster tube frames we recognize that it is not necessary to use an Axminster tube and in fact show shuttle weft mechanism instead of needle weft mechanism used with the Axminster loom.

The foundation for the knot is, of course, laid by the crossing of the warp threads and the passage of the tuft yarn through them in the crossed condition, but this tuft yarn is not diverted from its position as laid into the contour of a knot until the warp threads have resumed their parallel position. Because the movement of the yarn carrier, whether tube or gripper to lay the tuft yarn is complete, or may be completed, before this resumption of parallel positions of the yarn takes place it is convenient to refer to the movement of the yarn carrier as forming the knot which leads to possible confusion of language rather than fact in this regard. The actual recontouring of the laid tuft yarn into knot shape about warp threads may be gradual or sudden according to the conditions met.

It will be evident that all of our work is done in front of the reed and that methods and apparatus do not require deviation of the warp threads from their normal horizontal positions except as the warp threads must be formed in sheds and must be crossed permitting application of our invention to normal looms and normal loom-operating mechanisms with a minimum of change and that in the form of additions rather than alteration of existing construction.

It will further be evident that in our forms we insert a covered tuft yarn through from back to front, or from front to back down under the crossing and up again and then hold the yarn in position while the cover (tube) is withdrawn. This idea of utilizing the cover for protection of a tuft yarn as a means of handling it is present in all of the tube forms of our invention and the cover or tube is used to position the yarn for withdrawal at the surface or below the surface of the warp in the forms in which the yarn carrier instead of being a tube is a gripper. These various forms all permit the use of our invention upon warp threads which are maintained in the normal operating positions of the warp thread in ordinary loom practice namely, horizontal except as they depart from the horizontal for the formation of sheds.

In view of our invention and disclosure variations and modifications to meet individual whim or particular need will doubtless become evident to others skilled in the art, to obtain part or all of the benefits of our invention without copying the structure shown, and we, therefore, claim all such in so far as they fall within the reasonable spirit and scope of our invention.

Having thus described our invention what we claim as new and desire to secure by Letters Patent is:—

1. The method of forming Persian knots about the warp threads of a fabric using tuft thread carriers for the tuft threads and starting with the warp threads in parallel position, which consists in concurrently laterally diverting warp threads across other intervening warp threads to form double crossings of warp threads, one set near the fell and the other farther away from the fell, in passing the carrier beneath the warp threads longitudinally of the crossing near the lay beneath the crossing and then up through the warp threads in crossed position, subsequently releasing the crossed threads to permit them to straighten out and form a knot.

2. The method of forming Persian knots about the warp threads of a fabric using tuft thread carriers for the tuft threads and starting with the warp threads in parallel position, which consists in laterally diverting warp threads across other intervening warp threads to form a double crossing of warp threads between the fell and the lay, one near the fell and the other farther away from the fell, in passing the carrier beneath the warp threads longitudinally of the crossing near the lay beneath the crossing and then up through the warp threads in crossed position, and in holding fast to the tuft threads and at the same time driving them toward the fell.

3. The method of forming Persian knots about the warp threads of a fabric using tuft thread carriers for the tuft threads and starting with the warp threads in parallel position, which consists in laterally diverting warp threads across other intervening warp threads to form a double crossing of warp threads, one near the fell and the other between it and the lay, in passing the carrier beneath the warp threads longitudinally of the crossing near the lay beneath the crossing and then up through the warp threads in crossed position, in advancing the crossing point toward the fell coincidentally with advance of the tuft threads and subsequently releasing the warp threads and driving the tufts formed up against the fell.

4. The method of inserting tufts and forming knots in the tufts in a pile fabric by yarn guides, which consists in crossing the warp threads at a point between the fell and the reed, in inserting the tuft threads longitudinally of the crossings from one side of the crossing to the other, in releasing the crossings to form the knots while retaining hold on both ends of the tuft threads and in beating up the tuft threads.

5. In the method of passing yarn through under warp threads from the back to the front of crossed warp threads by means of yarn carriers, the step which consists in utilizing the yarn carrier to cross the warp threads.

6. In the method of passing yarn across from one side to the other of a warp thread pair crossing and utilizing the yarn when the crossing is released as in a Persian knot, the steps in the method which consist in passing the yarn across from the back to the front of the crossing and in holding the otherwise free end of the tuft yarn at the fell while weft is inserted and the weft and knot are beaten up.

7. In the method of passing yarn across from one side to the other of a warp thread pair crossing and utilizing the yarn when the crossing is released as in a Persian knot, the steps in the method which consist in passing the tuft yarn through from the back to the front side of the crossing and in holding both ends of the tuft yarn during release of the crossing, while weft is inserted and the weft and tuft yarn are beaten up.

8. In the method of passing yarn across from one side to the other of a warp thread pair crossing and utilizing the yarn when the crossing is released as in a Persian knot, the steps which consist in passing the tuft yarn through the crossing by a continuous movement down at the back of the crossing and up at the front of the crossing and holding both ends of the tuft yarn close to the fell while the crossed warp threads are released to straighten into parallel position.

9. In the method of passing yarn across from one side to the other of a warp thread pair crossing and utilizing the yarn when the crossing is released as in a Persian knot, the steps which consist in passing the tuft yarn through the crossing by a continuous movement down at the back of the crossing and up at the front of the crossing and holding the tuft yarn at the fell while the crossed warp threads are released to straighten into parallel position and one end of the tuft yarn is held while weft is introduced and the weft and tuft yarn are beaten up, the reed dents being maintained within the warp threads at all times.

10. In the method of passing yarn across from one side to the other of a warp thread pair crossing and utilizing the yarn when the crossing is released as in a Persian knot, the steps which consist in passing the tuft yarn through the crossing by a continuous movement down at the back of the crossing and up at the front of the crossing and holding both ends of the tuft yarn while weft is introduced and the weft and tuft yarn are beaten up.

11. The method of forming Persian knots upon warp threads, which consists in crossing the warp threads in pairs, in passing tuft yarn down at the back of the crossing, through beneath the crossing and up at the front of the crossing, in holding the otherwise free end of the tuft yarn at the fell while advancing the crossing toward the fell and pulling the other end of the tuft yarn toward the fell, in releasing the crossing, in inserting weft and in beating up the tuft yarn and the weft.

12. In the method of passing yarn across from the back to the front of the crossings of crossed pairs of warp threads by means of yarn carriers, the steps which consist in using the yarn carriers to maintain the warp thread pairs in crossed condition and releasing the crossings by withdrawing the carriers from their positions between the warp threads.

13. In the method of passing yarn across from the back to the front of the crossings of crossed pairs of warp threads by means of yarn carriers, the step which consists in using the carriers to hold both ends of the tuft yarn while weft thread is introduced and the weft threads and the knots are beaten up.

14. In the method of passing yarn across from the back to the front of the crossings of crossed pairs of warp threads by means of yarn carriers, the step which consists in using the carriers to advance the crossings toward the fell during insertion of the carriers through the warp threads.

15. In the method of passing yarn across from the back to the front of the crossings of crossed pairs of warp threads by means of yarn carriers, the step which consists in using the carriers to advance the crossings toward the fell during the withdrawal of the carriers from between the warp threads.

16. In the method of passing yarn across from the back to the front of the crossings of crossed pairs of warp threads by means of yarn carriers, the step which consists in using the carriers to advance the crossings toward the fell during both insertion and withdrawal of the carriers within and from the warp threads.

17. In the method of passing yarn across from the back to the front of the crossings of crossed pairs of warp threads by means of yarn carriers, the step which consists in using the carriers to carry the tuft yarn through between the warp threads of the respective pairs and also by engagement with the warp threads at the crossing to advance the crossing.

18. In the method of forming Persian knots around warp threads by means of yarn carriers, the step which consists in using the yarn carrier with the yarn within it to engage one warp thread of the pair and to shift it laterally to a point beyond the other warp thread of the pair.

19. In the method of forming a tuft yarn knot about a pair of warp threads the step which consists in laterally shifting one warp thread of the pair and shifting the tuft yarn past the second warp thread of the pair, to effect a crossing.

20. The method of passing tuft yarn about a pair of warp threads to form a Persian knot, using a yarn carrier, which consists in engaging the yarn carrier with one of the warp threads to carry the warp thread laterally beyond the other warp thread of the pair and to place the tuft yarn between the warp threads as crossed and in shifting the carrier to pass the tuft yarn past the crossing and between the warp threads in uncrossed position beyond the crossing, whereby the warp threads are crossed and the tuft yarn is inserted on one side of the crossing and passes between the warp threads upon the other side of the crossing also.

21. The method of passing yarn through under crossed warp threads by means of yarn carriers, which consists in shifting the carrier and the tuft yarn carried by the carrier relatively with respect to one warp thread of the pair to bring it in position laterally to engage this warp thread, in laterally shifting the carrier to shift the warp thread and the tuft yarn beyond the other warp thread of the pair, in shifting the carrier thus placed between the crossed warp threads to pass between the warp threads in uncrossed position whereby the tuft yarn is passed about the crossing, in holding the tuft yarn where it has been passed between the uncrossed warp threads while the carrier is withdrawn and in coincidentally with the withdrawal of the carrier releasing the crossing to form the knot.

22. In the method of forming a tuft yarn knot about a pair of warp threads, the steps which consist in coincidentally shifting one warp thread and a free end of tuft yarn laterally past the other warp thread, in coincidentally shifting the tuft yarn and the other warp thread laterally in a reverse direction while allowing the first warp thread to move back laterally, to equalize the crossing formed and in passing the free end of the tuft yarn past the crossing and through between the warp threads where they are not crossed.

23. In the method of passing yarn through under warp threads from the back to the front of crossed warp threads by means of tuft yarn carriers, the step which consists in forming a shed of the warp threads, in shifting the upper warp threads of the shed by the tuft yarn carrier beyond the lower warp threads of the shed, in relatively shifting the lower warp threads of the shed and the carrier vertically and then laterally shifting the carrier to engage the former lower warp threads of the shed to equalize the lateral distortion of the warp threads.

24. In the method of passing yarn between the warp threads past crossed warp threads and in the direction of the warp lengths by means of yarn carriers, the step which consists in forming a shed of the warp threads, in shifting the upper warp threads of the shed laterally by the carrier beyond the lower warp threads of the shed, in relatively vertically shifting the lower warp threads of the shed and the carrier and then shifting the carrier laterally to engage the former lower warp threads of the shed to equalize the lateral distortion of the warp threads and in passing the end of the carrier past the crossing point in the direction of the lengths of the warp threads and up between the warp threads.

25. In the method of passing yarn through under warp threads from the back to the front of crossed warp threads by means of yarn carriers, the step which consists in forming a shed of the warp threads, in shifting the upper warp threads of the shed laterally by the carrier beyond the lower warp threads of the shed, in relatively vertically shifting the lower warp threads of the shed and the carrier and then shifting the carrier laterally to engage the former lower warp threads of the shed to equalize the lateral distortion of the warp threads and at the same time intermediately passing the yarn between all of the warp threads in the rear of the crossing point, and in then carrying the yarn between the warp threads in front of the crossing point.

26. In the method of passing yarn through under warp threads from the back to the front of crossed warp threads by means of yarn carriers, the step which consists in forming a shed of the warp threads, in laterally shifting the upper warp threads of the shed by the carrier beyond the lower warp threads of the shed, in relatively vertically shifting the lower warp threads of the shed and the carrier and then shifting the carrier laterally to engage the former lower warp threads of the shed to equalize the lateral distortion of the warp threads and at the same time intermediately passing the yarn between all of the warp threads, and in then carrying the yarn between the warp threads in front of the crossing point and holding them substantially at the fell while the tube is withdrawn.

27. In the method of passing yarn through under warp threads from the back to the front of crossed warp threads by means of yarn carriers, the step which consists in forming a shed of the warp threads, in shifting the upper warp threads of the shed by the carrier laterally beyond the lower warp threads of the shed, in relatively vertically shifting the lower warp threads of the shed and the carrier and then laterally shifting the carrier to engage the former lower warp threads of the shed to equalize the lateral distortion of the warp threads, in shifting the crossing point of the warp threads by forward movement of the yarn carrier, in shifting the free end of the yarn through in front of the crossing point, in holding the yarn at this point and in swinging and upwardly moving the yarn carrier to bring the free end of the yarn above the warp threads and in close proximity to the fell.

28. The method of passing yarn through under warp threads from the back to the front of crossed warp threads by means of yarn carriers, which consists in crossing the warp threads with the yarn carrier in position back of the crossing point, in utilizing the yarn carrier to project between the warp threads and moving it toward the fell to shift the crossing point of the warp threads close to the fell.

29. The method of passing yarn through under warp threads from the back to the front of crossed warp threads by means of yarn carriers, which consists in crossing the warp threads with the yarn carrier in position back of the crossing point, in utilizing the yarn carrier to project between the warp threads and moving it toward the fell to shift the crossing point of the warp threads close to the fell, in using the yarn carrier to shift the free end of the yarn up between the warp threads in front of the crossing point and in holding them there while the yarn carrier is withdrawn back of the crossing point to form the knot.

30. The method of inserting tufts and forming knots in the tufts in a pile fabric by yarn guides, which consists in forming a shed of the warp threads, in using the guides to move the warps which are to be crossed with respect to other warp threads so that the guides are beyond the positions of the warp threads to be crossed, in advancing the guides between the warp threads crossed, in moving the guides laterally to intermediate position so that both warp threads crossed are engaged by each guide, in progressively carrying the guides further through the fabric while advancing toward the fell to advance the crossing point, in bringing the ends of the guides up between the warp threads in advance of the crossing point and close to the fell, in holding the free ends of the tuft yarn and in withdrawing the front end of the yarn guide downwardly, rearwardly and upwardly and holding the yarn in the guide while inserting weft and beating up the weft preparatory to cutting the attached end of the tuft yarn.

31. The method of forming a Persian knot about a pair of warp threads in a loom, which consists in crossing the warp threads, in shifting the crossing point of the warp threads closer to the fell than its normal position in the crossed warp threads, in passing the tuft yarn from one side of the crossing point to the opposite side to form the knot and in holding the otherwise free end of the tuft yarn while beating up the tuft yarn.

32. The method of forming a Persian knot about a pair of warp threads in a loom, which consists in crossing the warp threads, in shifting the crossing point of the warp threads closer to the fell than its natural position in the crossed warp threads, in passing the tuft yarn between the crossed warp threads and across the crossing point from one side of the crossing point to the opposite side to form the knot, in pulling the tuft yarn up toward the fell to shift the knot as close to the fell as possible, in releasing the warp threads and in holding both ends of the tuft yarn close to the fell while a shot of weft is passed through the warp shed formed by the warp threads and is beaten up toward the fell.

33. The method of forming a Persian knot about a pair of warp threads in a loom, which consists in crossing the warp threads, in shifting the crossing point of the warp threads closer to the fell than its natural position in the crossed warp threads, in passing the tuft yarn between the crossed warp threads and across the crossing point from back to front to form the knot, in pulling the tuft yarn up toward the fell to shift the knot as close to the fell as possible, in releasing the warp threads and in holding both ends of the tuft yarn close to the fell while a shot of weft is passed through the warp shed formed by the warp threads and is beaten up toward the fell.

34. The method of forming a Persian knot about a pair of warp threads in a loom, which consists in crossing the warp threads, in shifting the crossing point of the warp threads closer to the fell than its natural position in the crossed warp threads, in passing the tuft yarn between the crossed warp threads and across the crossing point from front to back to form the knot, in pulling the tuft yarn up toward the fell to shift the knot as close to the fell as possible, in releasing the warp threads and in holding both ends of the tuft yarn close to the fell while a shot of weft is passed through the warp shed formed by the warp threads and is beaten up toward the fell.

35. The method of forming Persian knots in operative relation with the warp threads of the loom consists in crossing the warp threads, while the warp threads are in horizontal position, in inserting a covered tuft yarn beneath the warp threads, across the crossing points, and up between the crossed warp threads by means of the cover and removing the cover while retaining the yarn in its position.

36. The method of forming Persian knots in operative relation with the warp threads of the loom consists in crossing the warp threads, while the warp threads are in horizontal position, in inserting a covered tuft yarn beneath the warp threads, in front of the reed, across the crossing points, and up between the crossed warp threads by means of the cover and removing the cover while retaining the yarn in its position.

37. In a loom, a yarn carrier, heddles for forming a shed and means for dipping the yarn carrier into the shed to shift the upper warp threads laterally with respect to the lower warp threads and to cross the warp threads.

38. In a loom, a yarn carrier, heddles for forming a shed, means for dipping the yarn carrier into the shed to shift the upper warp threads laterally with respect to the lower warp threads and to cross the warp threads and means for advancing the crossed point of the warp threads by movement of the carrier.

39. In a loom, a yarn carrier, heddles for forming a shed, means for dipping the yarn carrier into the shed, means for crossing the warp threads and means for advancing the crossed point of the warp threads by movement of the carrier.

40. In a loom, a curved carrier, heddles for forming a shed, means for dipping the yarn carrier into the shed, means for crossing the warp threads, means for advancing the crossed point of the warp threads by movement of the carrier and means for lifting the end of the curved carrier from a point behind the crossing point to a point in advance of the crossing point of the warp threads.

41. In a loom, a curved carrier, heddles for forming a shed, means for dipping the yarn carrier into the shed to shift the upper warp threads laterally with respect to the lower warp threads and to cross the warp threads, means for advancing the crossed point of the warp threads by movement of the carrier and means for lifting the end of the curved carrier from a point behind the crossing point to a point in advance of the crossing point of the warp threads.

42. In a loom, a curved tube, heddles for forming a shed, means for dipping the tube into the shed to shift the upper warp threads laterally with respect to the lower warp threads and to cross the warp threads and means for advancing the crossed point of the warp threads by movement of the tube and means for lifting the end of the curved tube from a point behind the crossing point to a point in advance of the crossing point of the warp threads and for clamping the free end of the tuft yarn where it emerges from the tube.

43. In a loom, a curved tube, heddles for forming a shed, means for dipping the tube into the shed and to shift the upper warp threads laterally with respect to the lower warp threads and to cross the warp threads, means for advancing the crossed point of the warp threads by movement of the tube and means for lifting the end of the curved tube from a point behind the crossing point to a point in advance of the crossing point of the warp threads and for clamping the free end of the tuft yarn where it emerges from the tube and for retracting the tube to release the tube from the warp threads.

44. In a loom, a curved tube, heddles for forming a shed, means for dipping the tube into the shed to shift the upper warps laterally with respect to the lower warp threads and to cross the warp threads and means for advancing the crossed point of the warp threads by movement of the tube, means for lifting the end of the curved tube from a point behind the crossing point to a point in advance of the crossing point of the warp threads and for clamping the free end of the tuft yarn where it emerges from the tube and means for retracting the tube from the warp threads while additionally advancing the crossing point of the warp threads and holding the attached end of the tuft yarn.

45. In a loom, a yarn carrier, heddles for forming a shed, yarn carrier frame means for dipping the tube into the shed to lift the upper warp threads laterally with respect to the lower warp threads, laterally shifting means to cross the warp threads, carrier means for advancing the crossed point of the warp threads, tube frame means for lifting the end of the curved tube from a point behind the crossing point to a point in advance of the crossing point of the warp threads, clamp means for holding the free end of the tuft yarn where it emerges from the tube, tube frame means for retracting the tube from the warp threads while additionally advancing the crossing point of the warp threads and holding the attached end of the tuft yarn and means for cutting the attached end so held.

46. In a loom for weaving knotted fabric, warp thread stretching and shifting mechanism, means for crossing warp threads substantially in the plane of the warp threads and a movable yarn tube adapted to be passed through beneath the crossed warp threads at one point from above and to pass its end between the warp threads at another point from below.

47. In a loom for weaving knotted fabrics, warp shifting mechanism, means for crossing the warp threads, a movable yarn carrier adapted to be passed through beneath the warp threads at one point from above and to pass its end between the warp threads at another point from below, and means for advancing the carrier to shift the crossing point of the warp threads toward the fell.

48. In a loom for weaving knotted fabrics, warp shifting mechanism, means for crossing the warp threads, a movable yarn carrier adapted to be passed through beneath the warp thread at one point from above and to pass its end between the warp threads at another point from below, and means for advancing the carrier, both on insertion and on withdrawal of the carrier, to shift the crossing point of the warp threads toward the fell.

49. In a loom for weaving knotted fabric, warp shifting mechanism, a tube adapted to be passed through beneath the warp threads at one point from above and to pass its end between the warp threads at another point from below, tube-operating means for crossing the warp threads so that the yarn carried by the tube crosses from the rear to the front of the crossing point on the warp threads and means for advancing the tube to shift the crossing point of the warp threads toward the fell and clamping means for the free end of the yarn close to the fell for holding the free end of the fell while forming the knot.

50. In a loom for weaving knotted fabric, warp shifting mechanism, means for crossing the warp threads, a movable yarn carrier adapted to be passed through beneath the warp threads at one point from above and to pass its end between the warp threads at another point from below, and clamping means for the free end of the yarn close to the fell for holding the free end of the yarn while forming the knot and shuttle and reed mechanism for forming and beating up weft yarn while the free end of the tuft yarn is held.

WALTER A. RICE.
FRANK G. SHINN.